United States Patent
Saito

(10) Patent No.: US 7,587,460 B2
(45) Date of Patent: Sep. 8, 2009

(54) DATA PROCESSING APPARATUS FOR GENERATING REDUCED IMAGES OF TRANSMISSION IMAGES OR REDUCED DATA OF TRANSMISSION DATA IN LIST FORM AND CONTROL METHOD THEREOF

(75) Inventor: Kazuyuki Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 09/983,100

(22) Filed: Oct. 23, 2001

(65) Prior Publication Data

US 2002/0052974 A1    May 2, 2002

(30) Foreign Application Priority Data

Oct. 31, 2000    (JP)    ............... 2000-333008

(51) Int. Cl.
*G06F 15/00* (2006.01)
*G06F 15/16* (2006.01)

(52) U.S. Cl. .......... 709/207; 358/1.13; 358/1.18; 709/204; 709/205; 709/206; 709/200

(58) Field of Classification Search ......... 709/205, 709/207, 204, 176, 208, 209, 119; 358/2.1; 382/176

See application file for complete search history.

(56) References Cited

U.S. PATENT DOCUMENTS

| | | | | |
|---|---|---|---|---|
| 5,870,089 | A * | 2/1999 | Fabbio et al. | 715/733 |
| 6,124,939 | A * | 9/2000 | Toyoda et al. | 358/1.15 |
| 6,369,906 | B1 * | 4/2002 | Nakao | 358/1.15 |
| 6,788,425 | B1 * | 9/2004 | Ohtsuka et al. | 358/1.13 |
| 6,950,198 | B1 * | 9/2005 | Berarducci et al. | 358/1.12 |
| 7,031,005 | B1 * | 4/2006 | Nakanishi | 358/1.15 |
| 7,350,236 | B1 * | 3/2008 | Silverbrook et al. | 726/26 |
| 2002/0037091 | A1 * | 3/2002 | Terasaki | 382/100 |
| 2002/0048043 | A1 * | 4/2002 | Takahashi et al. | 358/1.15 |

OTHER PUBLICATIONS

Yuichi Yagawa, Noriyuki Iwai, Kunihiro Yangagi, Keiji Kojima, The Digital Album: A Personal File-tainment System, 1996, The University of Tokyo, pp. 433-439.*

* cited by examiner

*Primary Examiner*—Ario Etienne
*Assistant Examiner*—Sahera Halim
(74) *Attorney, Agent, or Firm*—Fitzpatrick, Cella, Harper & Scinto

(57) ABSTRACT

Read images are stored and images to be transmitted are selected. When the selected images are transmitted, list data listing a group of reduced images of the images is generated. The generated list data is printed, displayed, or otherwise output, allowing a user to readily check the transmitted images.

7 Claims, 6 Drawing Sheets

TO : ○○○○  i/N PAGE
DATE : 200X / XX / △△

Box No. : 12345
image name : person I

Box No. : 54321
image name : sunshine

DATA PROCESSING APPARATUS FOR GENERATING REDUCED IMAGES OF TRANSMISSION IMAGES OR REDUCED DATA OF TRANSMISSION DATA IN LIST FORM AND CONTROL METHOD THEREOF

BACKGROUND OF THE INVENTION

1. Field of the Invention

The present invention relates to a data processing apparatus for generating reduced images of transmission images or reduced data of transmission data in list form and a control method of the data processing apparatus.

2. Related Background Art

In addition to a copying facility for reading an original and printing its image, a facility for storing the read image and a facility for transmitting the image to a designated destination on a network have been added to a digital copying machine in recent years.

Such a copying machine is capable of displaying reduced images of read and stored images and printing or transmitting the original image of a reduced image selected from the displayed reduced image.

However, the prior-art copying machine presents the following problems, making the machine inconvenient to users:
(1) It provides no at-a-glance list of transmitted data (such as an image). Therefore it takes a lot of troubles to check the transmitted image.
(2) Only information about the transmission of an image (such as the transmission date and destination of the image) is recorded and it takes a lot of troubles to check to see which image is transmitted and when.

That is, no data is available that associates transmitted data with its transmission information.

SUMMARY OF THE INVENTION

An object of the present invention is to solve these problems and improve a usability of the machine.

It is another object of the present invention to generate a list of transmission images and transmission data.

It is yet another object of the present invention to generate a list of pages of transmission data.

Other objects of the present invention will be apparent from the following description and accompanying drawings.

DESCRIPTION OF THE PREFERRED EMBODIMENTS

Referencing to the accompanying drawings, embodiments of the present invention will be described below with respect to examples thereof.

First Embodiment

Figure 1:
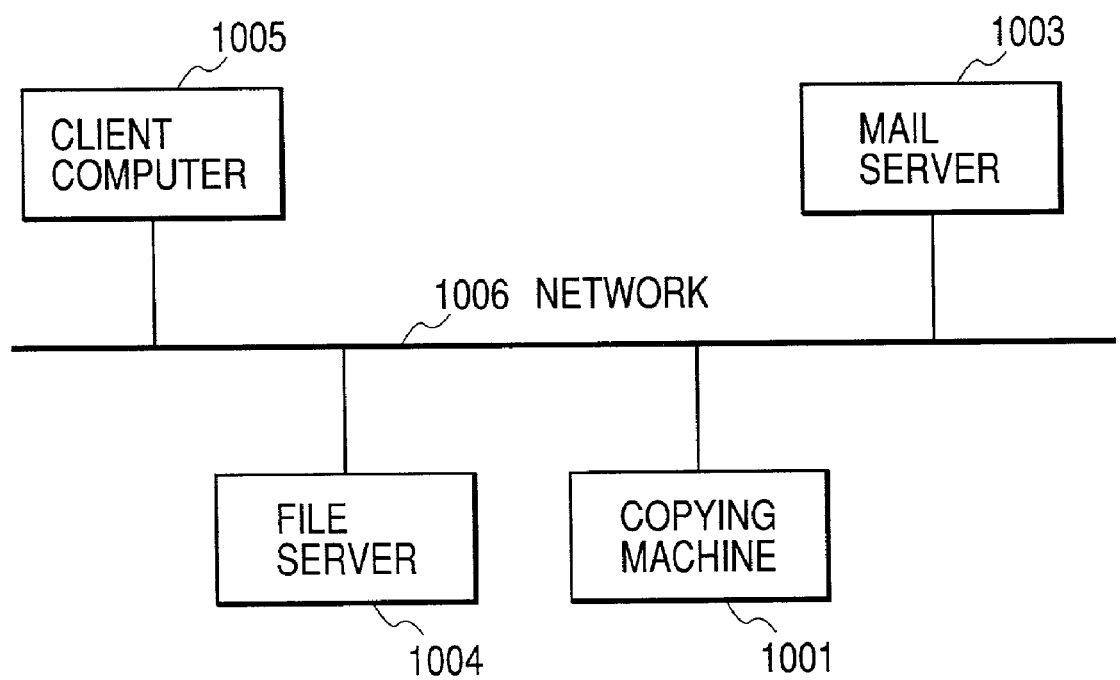
FIG. 1 shows a basic system configuration of first and second embodiments.

FIG. 1 is a diagram of a basic system configuration according to a first embodiment. A copying machine 1001 is a machine for reading a plurality of originals and transmitting them to various devices. A mail server 1003 and a file server 1004 are computers for storing data read by the copying machine 1001. A client computer 1005 is a computer connected to the mail server 1003 and the file server 1004 for obtaining and displaying data. A network 1006 is a network to which the copying machine 1001, the mail server 1003, the file server 1004, and the client computer 1005 are connected. The mail server 1003 is an SMTP (Simple Mail Transfer Protocol) server. The file server 1004 is an FTP (File Transfer Protocol) server, NetWare server, or SMB (Server Message Block Protocol) server.

Figure 2:
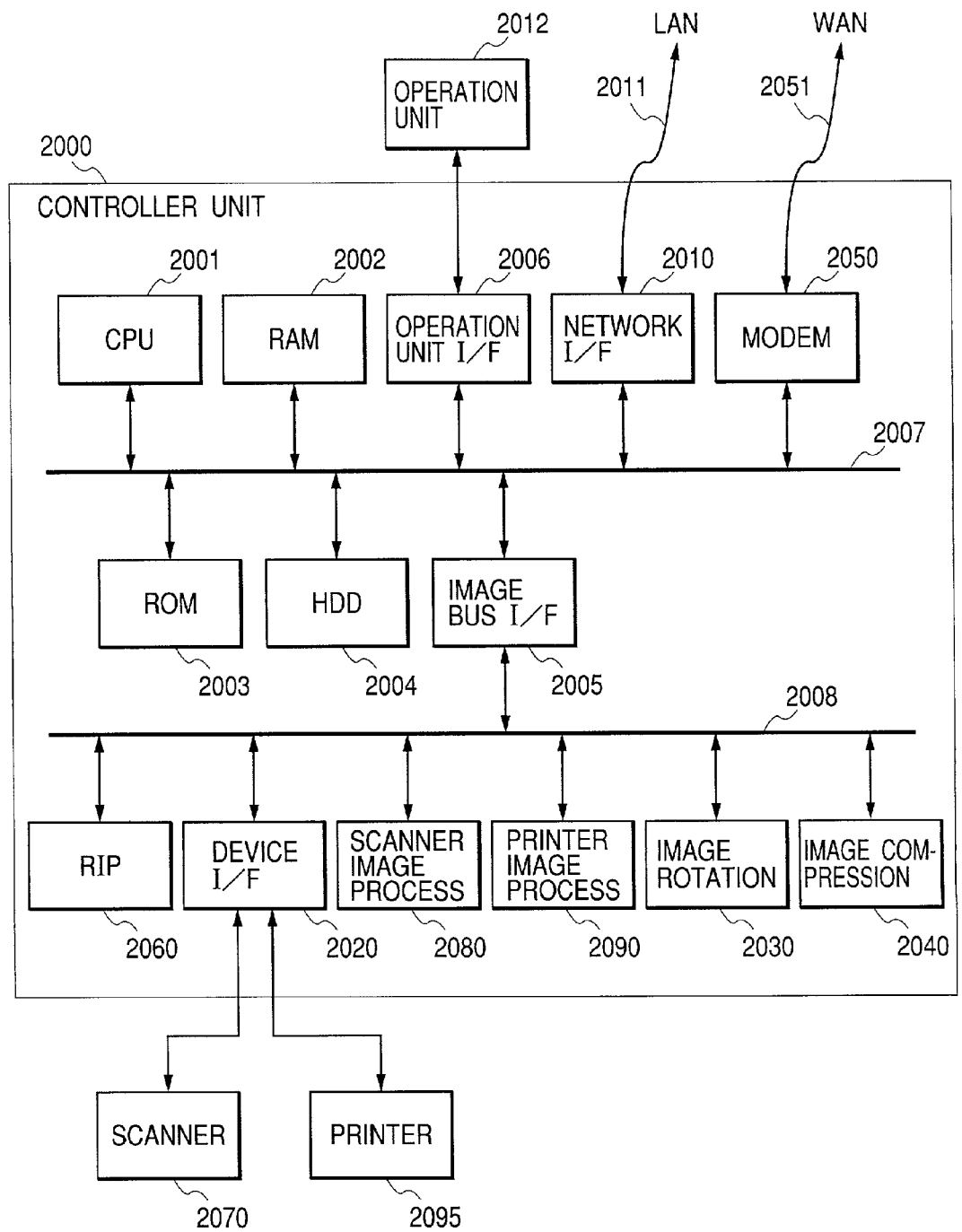
FIG. 2 is a system block diagram of the first and second embodiments.

FIG. 2 is a block diagram of the system according to the first embodiment, which is installed in the copying machine 1001. A controller unit 2000 is a controller connected to a scanner 2070, which is an image input device, and a printer 2095, which is an image output device, and also connected to a LAN 2011 and a WAN 2051, for inputting and outputting image information and device information.

A CPU 2001 is a controller for controlling the entire system. A RAM 2002 is system working memory which is used by the CPU 2001 for operating as well as image memory for temporarily storing image data.

A ROM 2003 is a boot RAM for storing a boot program for the system. An HDD 2004 is a hard disk drive for storing system software and image data. The HDD 2004 has a plurality of image storage areas (boxes). A name (box number) is assigned to each box for identification. The box number is specified to select a storage area into which an image is stored.

An operation unit I/F 2006 is an interface to operation unit (UI) 2012. The operation unit I/F 2006 has a touch panel and provides to the operation unit 2012 display data to be displayed on the operation unit 2012. It is also responsible for transmitting information input by the user of the system on the operation unit 2012 to the CPU 2001.

A network I/F 2010 is connected to the LAN 2011 for inputting and outputting information. A modem 2050 is connected to the WAN 2051 for inputting and outputting information.

These devices are coupled on system bus 2007.

An image bus I/F 2005 is a bus bridge for connecting the system bus 2007 with image bus 2008, which transfers image data at high speed, and performing data structure conversion. The image bus 2008 is constituted by a PCI bus or an IEEE 1394 bus. The following devices are coupled on the image bus 2008.

A raster image processor (RIP) 2060 converts a PDL code into a bitmapped image. A device I/F 2020 connects the scanner 2070 and printer 2095 which are input/output device for image with the controller 2000 and performs synchronous/asynchronous conversion on image data.

A scanner image process module 2080 corrects, processes, and edits input image data. A printer image process module 2090 performs correction and resolution conversion on print output image data.

An image rotation module 2030 rotates image data. An image compression module 2040 performs JPEG compression/decompression on multi-valued image data and performs JBIG, MMR, or MH compression/decompression on binary image data.

Figure 3:
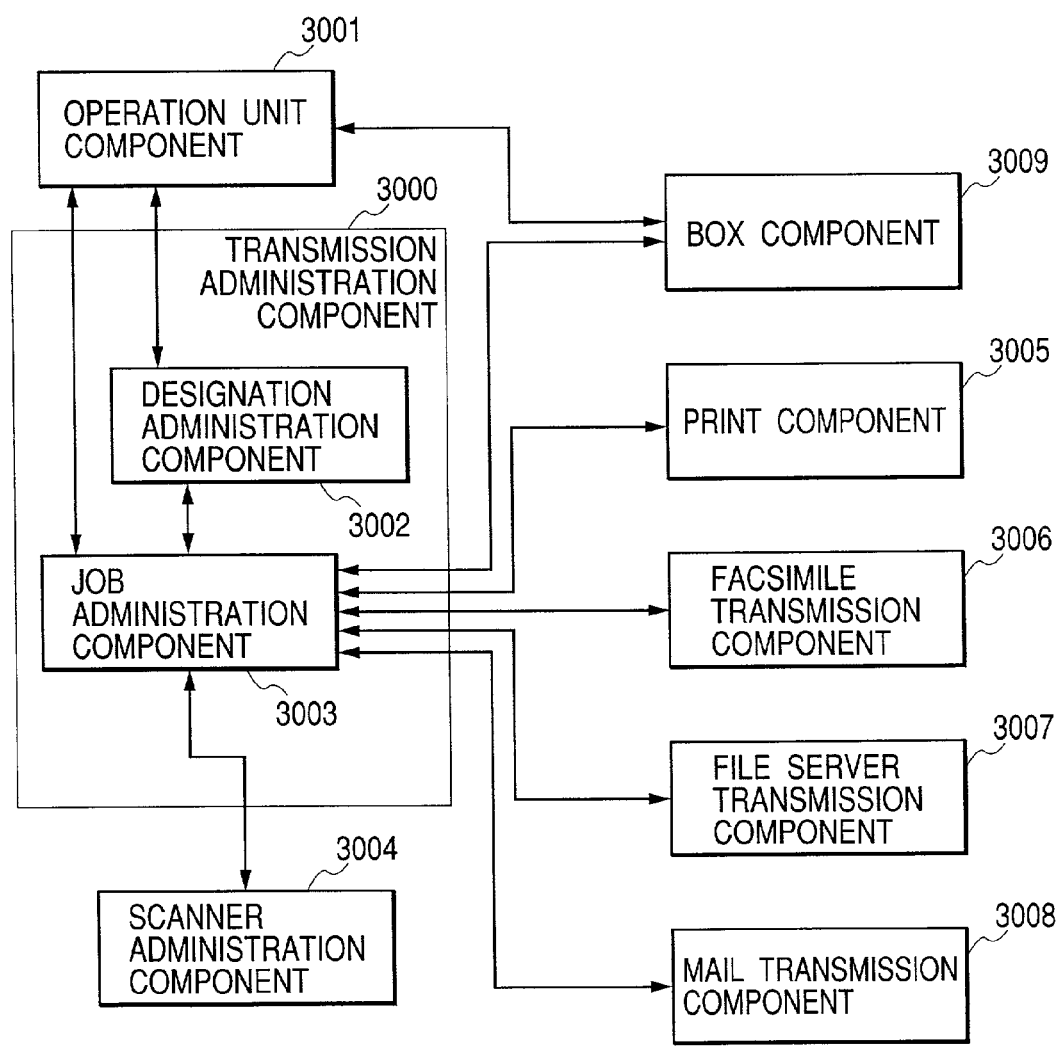
FIG. 3 is a block diagram of software according to the first and second embodiments.

FIG. 3 is a block diagram of transmission facility software according to the first embodiment. The software is installed in the controller unit 2000. An operation component 3001 obtains information specifying the resolution of an image to be read, monochrome/color mode, a storage area into which the image is stored, an image selected from a number of stored images, a protocol used for transmission, and the format and destination of an image to be transmitted according to specifications provided through a touch key operation by the user.

A transmission administration component 3000 directs a scanner administration component 3004 to read an original according to specifications such as the resolution of the image to be read, monochrome/color mode, and the storage area into which the read image is to be stored which are selected in the operation component 3001 and indicates to box component 3009 the storage area into which the read image is stored.

The transmission administration component 3000 also obtains destination information from a designation administration component 3002 and issues transmission instructions to a print component 3005, a facsimile transmission component 3006, a file server transmission component 3007, and a mail transmission component 3008 according to specifications such as an image selected in the operation component 3001, a protocol used for transmission, and the format and destination of the image to allow stored image data to be transmitted to a printer, facsimile, file server 1004, and mail server 1003, respectively.

In particular, the file server transmission component 3007 and the mail transmission component 3008 use FTP, NetWare, SMB, and SMTP protocols to perform transmission to the mail server 1003 and file server 1004, generate reduced images of a plurality of selected images, group them into groups of a predetermined number of reduced images, and create a list image containing a group of reduced images along with information such as transmission time and destinations, then use the print component 3005 to print the image.

Figure 6:
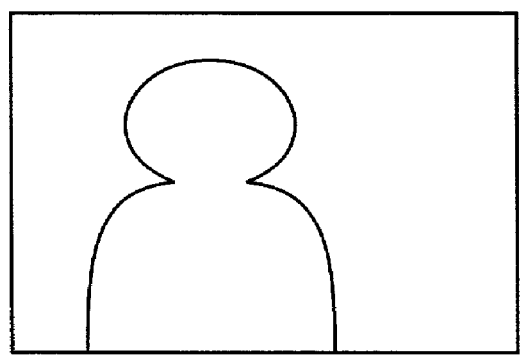
FIG. 6 shows an example of the transmission list data according to the first and second embodiments.
Figure 6:
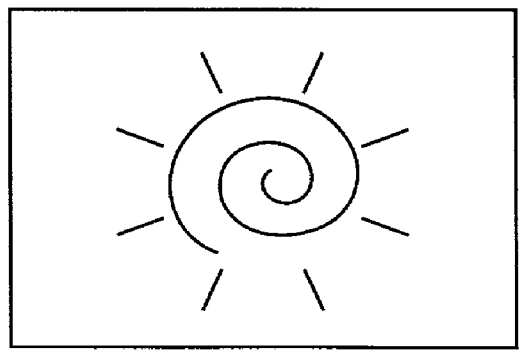

FIG. 6 shows an example of the list image in which the above-mentioned predetermined number is two. Each reduced image is labeled with the number of box in which the image is stored and an image name.

The transmission administration component 3000 consists of the designation administration component 3002 and the job administration component 3003 controlling jobs provided to and from the scanner administration component 3004 and each transmission component.

That is, at the time of reading an image and storing it in the HDD 2004, a user of the copying machine selects a resolution used in scanning originals, indication of whether it is a monochrome or color image, and a box number indicating a storage area into which the image is stored through a touch key operation on the operation unit 2012.

Then the user of the copying machine places N originals on the scanner 2070 and issues a direction for starting the read of the originals through the operation unit 2012. These items of information are gathered in the operation component 3001 and transmitted to the job administration component 3003.

The job administration component 3003 handles these items of information as one job. The operation component 3001 displays the job on the operation unit 2012 to allow for the acceptance of an operation issued by the user of the copying machine 1001 for selecting the job to cancel it.

Then, the job administration component 3003 provides the indications of the resolution and whether the read is performed in a monochrome or color mode to the scanner administration component 3004. The component 3004 performs the specified monochrome or color read at the specified resolution through the device I/F 2020, actuates and causes the scanner 2070 to read the N originals, obtains an input image and corrects, processes, and edits the input image data through the scanner image process module 2080.

Then image rotation module 2030 is used to rotate the input image and, if monochrome read mode is specified, the image compression module 2040 is used to compress the image with CCITT two-dimensional encoding (hereinafter called MMR), convert it into N S-TIFF (Single Page Tag Image File Format) files, and store them in the HDD 2004.

If a color read is specified, the image compression module 2040 compresses the image with JPEG compression into N JPEG (Joint Photographic Experts Group Format) files, and stores them in the HDD 2004.

The indication of whether color or monochrome, the size of the image, the number of image pages, and the read date and time are also stored. After the completion of the storage, the scanner administration component 3004 indicates the locations of the images stored in the HDD 2004 to the job administration component 3003.

The job administration component 3003 indicates the locations and box numbers of the images stored in the HDD 2004 to the box component 3009. The box component 3009 stores associations between the locations of the images stored in the HDD 2004 and their box numbers.

After the above-described operations are repeated a number of times, information about a number of monochrome and color images read through the repeated operations is stored in the box component 3009 together with their box numbers.

Then, if the user wants to transmit stored images, he/she selects the images he/she wants to transmit, its format, a protocol used for the transmission, and the destination through a touch key operation on the operation unit 2012. First, the user specifies box numbers. Then, the operation component 3001 can provide an inquiry to the box component 3009 to obtain from the HDD 2004 information, that is, indications of whether images are in color or monochrome, the sizes of the images, the number of pages, and the read dates and times, added to the plurality of images associated with the specified box numbers and display them.

The user selects more than one time images to be transmitted by touch key operations with reference to the information. The operation component 3001 stores the selected images and the order in which they are selected.

If the selected images are monochrome images, S-TIFF, M-TIFF, or PDF (Portable Document Format) can be selected as the format of the images when transmitted. If the selected images are color images or monochrome and color images, JPEG or PDF can be selected.

M-TIFF or PDF is selected if the images are monochrome images, or PDF is selected if the images are color images or monochrome and color images. That is, the format for converting a plurality of original images into one file is selected.

SMTP, FTP, NetWare, or SMB can be selected as the format used for the transmission. If FTP, NetWare, or SMB is selected, destination information is a server name, and a user name, password, and directory name on the server. If SMTP is selected, the destination information is an e-mail address.

After the user selects these items of information, the user indicates the start of the transmission to the operation component 3001 through a touch key operation on the operation unit 2012. The operation component 3001 indicates to the job administration component 3003 the images to be transmitted, the order in which they are selected, the format of the images, a protocol used for the transmission, and their destination.

If the protocol used for the transmission is FTP, NetWare, or SMB, then, the job administration component 3003 selects the file server transmission component 3007 as the component that processes the job and indicates information about the locations in the HDD 2004 (box numbers) of the images to be transmitted, the order in which the images are selected, the format, and the protocol for the transmission, and the destination to the file server transmission component 3007.

Then, the file server transmission component 3007 reads the indicated protocol, determines a protocol to be used for the transmission through the Network I/F 2010, and uses the protocol to accesses a file server 1004, which is the indicated destination.

The indicated server name and the user name and password on the server are used to log in to the specified file server 1004 and specify a directory in which the transmitted image file is stored.

A file name is automatically generated and specified according to the date and time and the specified format. Alternatively, if the protocol used for the transmission is SMTP, the job management component 3003 selects the mail transmission component 3008 as the component that processes the job and the locations in the HDD 2004 of the images to be transmitted, the order in which the images are selected, the format, and the destination to the mail transmission component 3008. Then, the mail transmission component 3008 logs in to a mail server 1003 and indicates the indicated e-mail address.

The present embodiment will be described with respect to an example in which the format indicated is M-TIFF. If the indicated format is M-TIFF, the mail transmission component 3008 or the file server transmission component 3007 reads the images from the HDD 2004 in a specified order, converts them into the M-TIFF format, and transmits them to the mail server 1003 or file server 1004.

In this process, reduced images of the selected plurality of images are generated and pages of image data (transmission list data) listing a predetermined number of the reduced images and information such as transmission time and their destination are generated and printed (FIG. 6) as many as the total number of images to be transmitted can be contained. For example, if 10 images are to be transmitted and two reduced images are to be contained in one transmission list data, a total of five pages transmission list data are generated.

Figure 4:
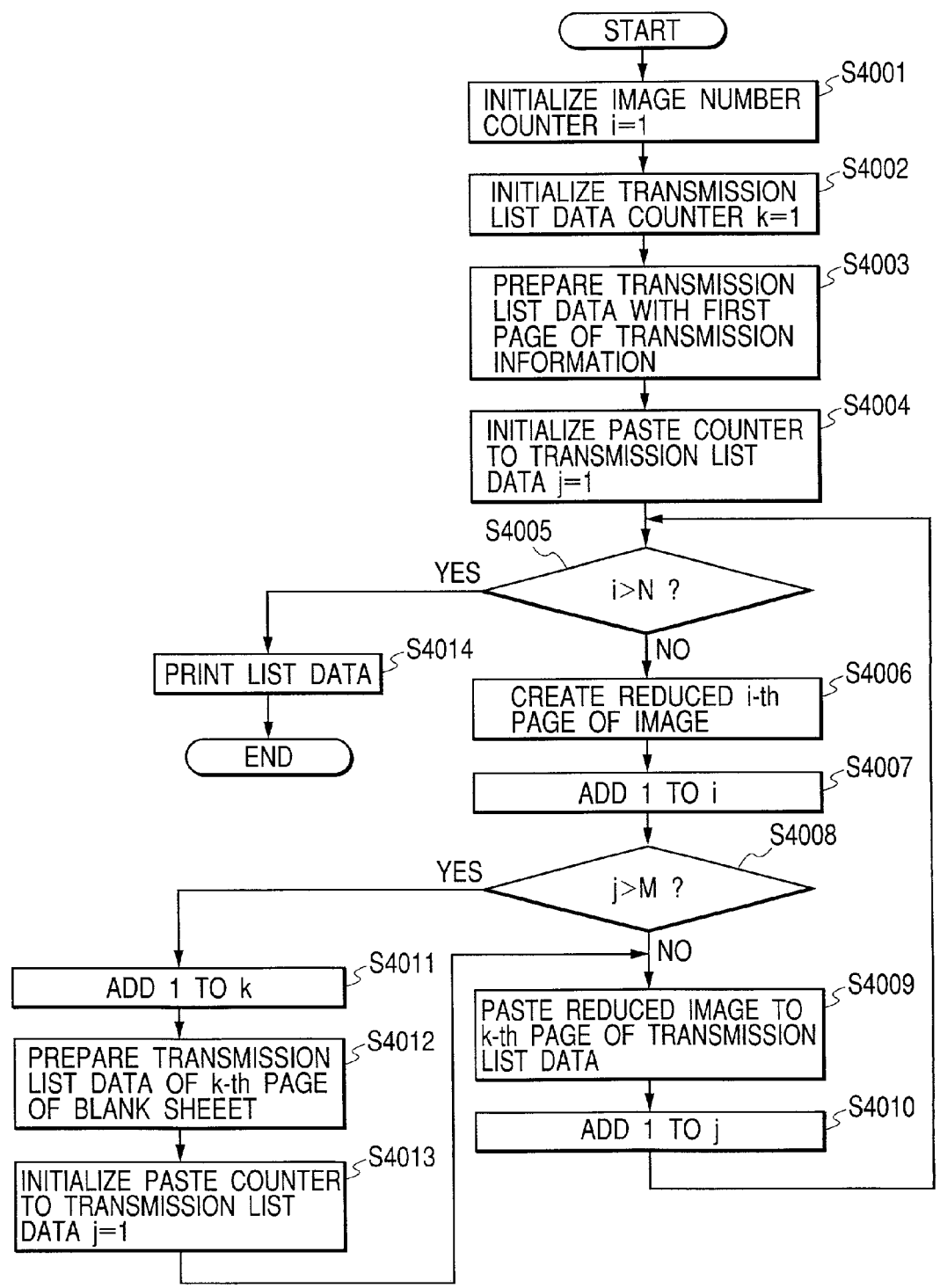
FIG. 4 is a flowchart of an example of a process for generating transmission list data according to the first embodiment.

The transmission list data generation process will be described in detail below with reference to FIG. 4. First, a counter i for counting the number of images to be sent to the mail server 1003 or file sever 1004 is initialized to one at step S4001.

Then, a counter k for counting the number of pages of transmission list data is initialized to one at step S4002. At step S4003, transmission list data to which transmission information for the first page of transmission information is added is prepared.

Then, at step S4004, a counter J for counting the number of reduced images contained in the transmission list data is initialize to one.

At step S4005, i is compared with N, where N is the total number of images, and if i is less than or equal to N, the process proceeds to step S4006.

The first image input in the HDD 2004 and attribute information about the image are read out from the HDD 2004 and the i-th reduced image is generated at step S4006, and 1 is added to i at step S4007.

Then, the maximum number M of reduced images to be contained in one page of the transmission list data is compared with j and, if j is less than or equal to M, the process proceeds to step S4009.

The i-1-th reduced image is added to the k-th page of the list data at step S4009 and 1 is added to j at step S4010.

Then, the process returns to step S4005 and the same process is repeated for the second and subsequent pages.

If at step S4008 j exceeds the maximum number M of reduced images to be contained in one page of the list data, the process proceeds to step S4001, where 1 is added to k. Then a new, blank sheet of the transmission list data is prepared at step S4012.

Then, j is initialized to one at step S4013 and the process proceeds to step S4009. Then, the same process as described above is repeated.

If i exceeds the total number N of the images at step S4005, then all the images to be transmitted have been added to the transmission list data as reduced images. Therefore, the process proceeds to step S4014, where all the transmission list data as shown in FIG. 6 is printed.

Second Embodiment

A PDF file can contain thumbnail images (reduced image). A file may be converted into a PDF file containing thumbnail images after images are read and the thumbnail image of each page may be retrieved and added to transmission list data when the PDF file is transmitted.

Figure 5:
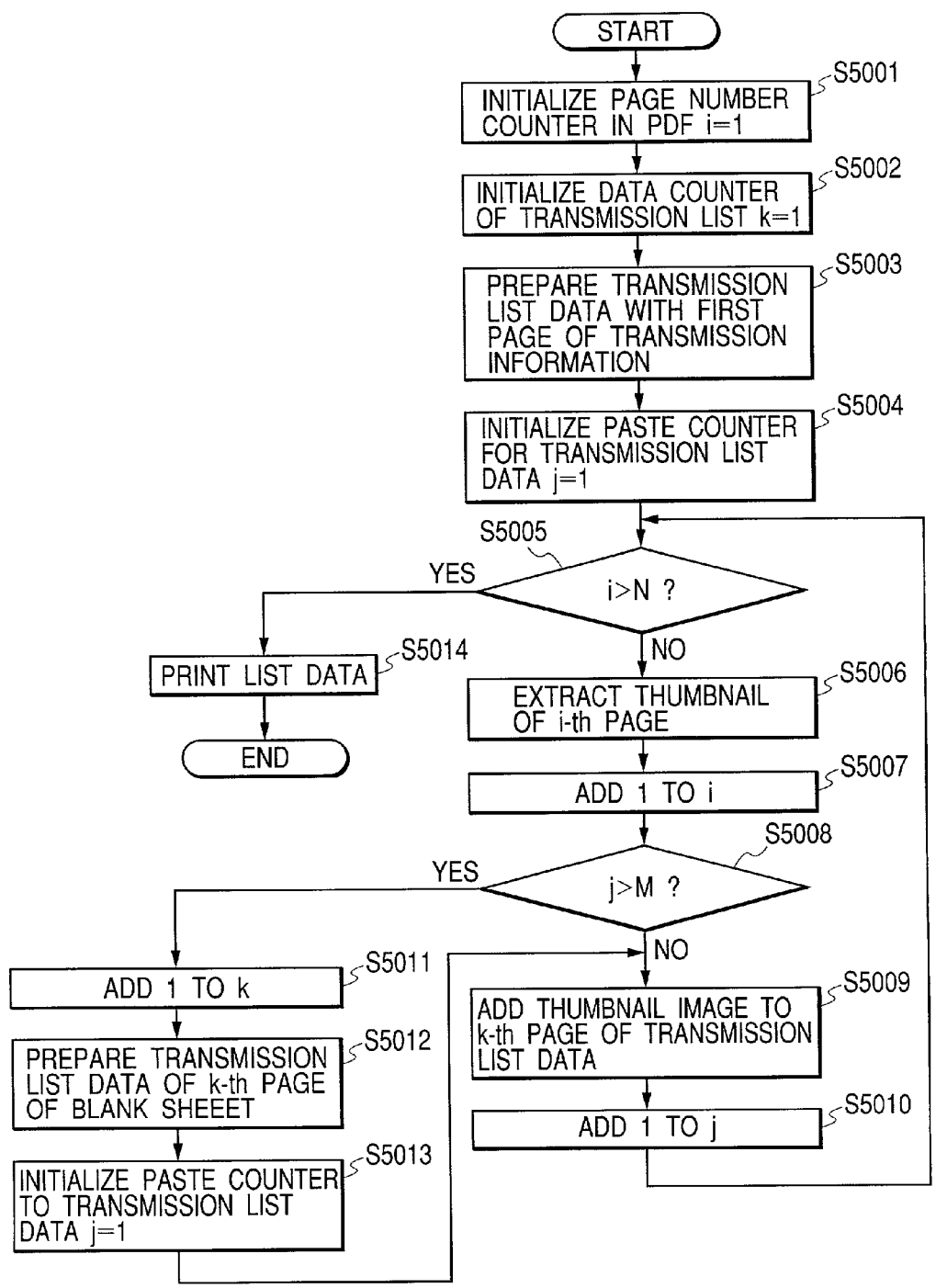
FIG. 5 is a flowchart of an example of a process for generating transmission list data according to the second embodiment.

This will be described below in detail with reference to FIG. 5. First, a counter i for counting pages in a PDF file to be transmitted to a mail server 1003 or file server 1004 is initialized to one at step S5001.

Then, a counter k for counting the number of pages of transmission list data is initialized to one at step S5002. Transmission list data to which the first page of transmission information is added is prepared at step S5003.

At step S5004, a counter j for counting the number of reduced images added to the transmission list data is initialized to one.

Then, i is compared with the total number N of pages in the PDF file at step S5005, and if i is less than or equal to N, the process proceeds to step S5006.

At step S5006, the PDF file converted and stored in the HDD 2004 when the images were input is read from the HDD 2004 and the reduced image (thumbnail image) of the i-th page is extracted. Then 1 is added to i at step S5007.

Then, j is compared with the maximum number M of reduced images to be contained in one page of the transmission list data at step S5008, and if j is less than or equal to M, the process proceeds to step S5009.

At step S5009, the reduced image (thumbnail image) of the i-th page is added to the k-th page of the list data, then 1 is added to j at step S5010. Then, the process returns to step S5005 and the same process is repeated for the second and subsequent pages.

If j exceeds the maximum number M of reduced image to be contained in one page of the list data at step S5008, the process proceeds to step S5011, where 1 is added to k. Then, a new, blank page of the transmission data is prepared at step S5012.

J is initialized to one at step S5013, then the process proceeds to step S5009 and the same process described above is repeated.

If i exceeds the total number N of pages of the PDF file at step S5005, then, all the pages of the PDF file to be transmitted have been added to the transmission list data as reduced images. Therefore, the process proceeds to step S5014, where all the transmission list data as shown in FIG. 6 is printed.

While the transmission list data is printed in the embodiments described above, the generated transmission list data can be stored as a file in the HDD or displayed on a display instead of being printed.

The output form of the transmission list data can be selected in advance from among print, store, or display outputs and whether the transmission list data is to be output or not can be selected before hand through an operation on the operation unit 2012.

In addition, the maximum number of reduced images contained in one page of the list data may be specified by a user at will through an operation on the operation unit 2012. Also a setting is possible that lists all reduced images in one page of the list data. In these cases, the sizes of reduced images are automatically adjusted according to the size of one page of the list data and the number of the reduced images listed in one page.

Furthermore, the user may set the size of reduced images at will through an operation on the operation unit 2012. In such a case, the number of the reduced images contained in one page of the list data is automatically adjusted.

As described above, according to the embodiments, (1) an at-a-glance list of transmitted data is made available and (2) data can be provided in which transmitted data is associated with its transmission information (such as the transmission date and time and destination), and therefore, the convenience to users can be improved.

The present invention also includes an implementation in which a software program code for embodying the functions of the above-described embodiments is provided and stored in a computer (CPU or MPU) of a system or apparatus to cause the system or apparatus to operate according to the stored program code.

In this case, the above-mentioned software program code itself embodies the functions of the above-described embodiments and the program code itself and means for providing the program code to the computer, for example, a recording medium storing the program code, constitutes the present invention. The recording medium storing the program code may be a floppy disk, hard disk, optical disk, magneto-optical disk, CD-ROM, magnetic tape, volatile memory card, or ROM, for example.

The above-described embodiments have been provided by way of example in implementing the present invention and the technical scope of the present invention should not be construed in a limiting sense. That is, the present invention can be implemented in various forms without departing from its technical idea and major features.

According to the present invention, the list of transmission data is provided to improve convenience to the users as described above.

What is claimed is:

1. A data processing apparatus, comprising:
    a storage unit including a plurality of storage areas, each being assigned identification information identifying the storage area, and each being configured to store one or more images;
    a first selection unit configured to select a plurality of images from among images stored in at least one storage area selected from among the plurality of storage areas of said storage unit in response to an operation on an operation unit;
    a transmission unit configured to transmit the plurality of images selected by said first selection unit;
    a designation unit configured to designate a number of thumbnails to be presented on each page of a thumbnail list to be generated as an image transmission history in response to an operation on the operation unit;
    a thumbnail generation unit configured to generate thumbnails of the plurality of images selected by said first selection unit, and also configured to extract thumbnails from the plurality of images selected by said first selection unit when said transmission unit transmits the plurality of images;
    a thumbnail list generation unit configured to generate a thumbnail list that consists of thumbnails of the plurality of selected images using the thumbnails generated or extracted by said thumbnail generation unit in accordance with the number of thumbnails designated by said designation unit, sizes of the thumbnails presented on the thumbnail list being automatically adjusted based on the number of thumbnails designated by said designation unit, the thumbnail list being provided for each transmitted image with (a) transmission time information and destination information for the transmitted image and (b) the identification information for the storage area storing the transmitted image; and
    a print unit configured to print the thumbnail list generated by said thumbnail list generation unit so as to allow the user to check the plurality of images transmitted by said transmission unit,
    wherein said thumbnail list generation unit generates the thumbnail list and said print unit prints the thumbnail list in response to a transmission of the plurality of selected images by said transmission unit.

2. The data processing apparatus according to claim 1, wherein the transmission time information contains at least one of: a transmission date and a transmission time.

3. The data processing apparatus according to claim 1, further comprising a second selection unit configured to select whether printing by said print unit should be performed.

4. The data processing apparatus according to claim 1, wherein said generation unit generates a number of pages of an image list according to the number of said thumbnails listed in one page.

5. The data processing apparatus according to claim 1, further comprising a setting unit configured to set a quantity of thumbnails to be listed in one page.

6. The data processing apparatus according to claim 1, further comprising a setting unit configured to set a size of the thumbnails.

7. A method of controlling an image processing apparatus having a storage unit including a plurality of storage areas, each being assigned identification information identifying the storage area, and each being configured to store one or more images, the method comprising steps of:
    selecting a plurality of images from among images stored in at least one storage area selected from among the plurality of storage areas of the storage unit in response to an operation on an operation unit;
    transmitting the plurality of images selected in said selecting step;
    designating a number of thumbnails to be presented on each page of a thumbnail list to be generated as an image transmission history in response to an operation on the operation unit;
    generating thumbnails of the plurality of images selected in said selecting step or extracting thumbnails from the plurality of images selected in said selecting step when said transmission step transmits the plurality of images;
    generating a thumbnail list that consists of thumbnails of the plurality of selected images using the thumbnails generated or extracted in said thumbnail generating step in accordance with the number of thumbnails designated in said designating step, sizes of the thumbnails presented on the thumbnail list being automatically adjusted based on the number of thumbnails designated in said designating step, the thumbnail list being provided for each transmitted image with (a) information indicating a transmission time and a destination for the transmitted image and (b) the identification information for the storage area storing the transmitted image; and printing the thumbnail list generated in said thumbnail list generating step so as to allow the user to check the plurality of images transmitted in said transmitting step, wherein said step of generating the thumbnail list and said step of printing the thumbnail list are performed in response to a transmission of the plurality of images.

* * * * *